(12) United States Patent
Keller et al.

(10) Patent No.: US 6,491,851 B1
(45) Date of Patent: Dec. 10, 2002

(54) METHOD FOR OBTAINING AN OPHTHALMIC LENS COMPRISING A SURFACE UTILITY MICROSTRUCTURE AND RESULTING OPHTHALMIC LENSES

(75) Inventors: Gerhard Keller, Saint Maur des Fosses; Jean-François Dufresne, Roissy en Brie; Gilles Massey, Chennevieres sur Marne, all of (FR); Sidney Shaw White, Jr.; Walter Charles Braley, both of Seminole, FL (US); Wilson Basilio Morales, Jr., St Petersburg, FL (US); Richard Bosmans, Noiseau (FR)

(73) Assignee: Essilor International Compagnie Generale d'Optique, Charenton Cedex (FR)

( * ) Notice: Subject to any disclaimer, the term of this patent is extended or adjusted under 35 U.S.C. 154(b) by 0 days.

(21) Appl. No.: 09/590,800

(22) Filed: Jun. 9, 2000

Related U.S. Application Data

(63) Continuation of application No. PCT/FR98/02572, filed on Nov. 30, 1998.

(30) Foreign Application Priority Data

Dec. 11, 1997 (FR) .............................. 97 15712

(51) Int. Cl.$^7$ .............................................. B29D 11/00
(52) U.S. Cl. ........................ 264/1.32; 264/1.7; 264/1.8; 264/1.36; 264/2.5
(58) Field of Search .................. 264/1.31, 1.7, 264/1.32, 1.8, 2.5, 1.36, 571, DIG. 78

(56) References Cited

U.S. PATENT DOCUMENTS

| | | | |
|---|---|---|---|
| 4,013,465 A | 3/1977 | Clapham et al. | |
| 4,347,198 A | 8/1982 | Ohkada et al. | ............... 264/2.3 |
| 5,013,494 A * | 5/1991 | Kubo et al. | ................. 264/1.31 |
| 5,071,597 A * | 12/1991 | D'Amato et al. | ............ 264/2.5 |
| 5,538,674 A | 7/1996 | Nisper | ......................... 264/1.31 |
| 5,630,902 A | 5/1997 | Galarneau et al. | ........ 156/379.8 |
| 5,728,324 A * | 3/1998 | Welch et al. | ............... 264/1.31 |
| 5,938,989 A * | 8/1999 | Hambright | .................. 264/1.32 |

FOREIGN PATENT DOCUMENTS

| | | |
|---|---|---|
| EP | 0 353 748 | 2/1990 |
| EP | 0 400 672 | 12/1990 |
| FR | 2 663 431 | 12/1991 |
| FR | 2 699 541 | 6/1994 |
| FR | 2 702 486 | 9/1994 |
| FR | 2 734 827 | 12/1996 |
| GB | 2 027 441 | 2/1980 |
| WO | WO 93/13933 | 7/1993 |

* cited by examiner

*Primary Examiner*—Mathieu D. Vargot
(74) *Attorney, Agent, or Firm*—Fulbright & Jaworski L.L.

(57) ABSTRACT

The invention concerns a method for obtaining an ophthalmic lens comprising a surface utility microstructure, in in particular antiglare. The method for obtaining an ophthalmic lens comprising a surface utility microstructure consists in a step for transferring the microstructure into the lens surface from a mould whereof the internal surface bears the microstructure and has a sight correcting geometric design, the microstructure being initially determined by an interferential process. The invention is useful for making ophthalmic lenses.

26 Claims, 5 Drawing Sheets

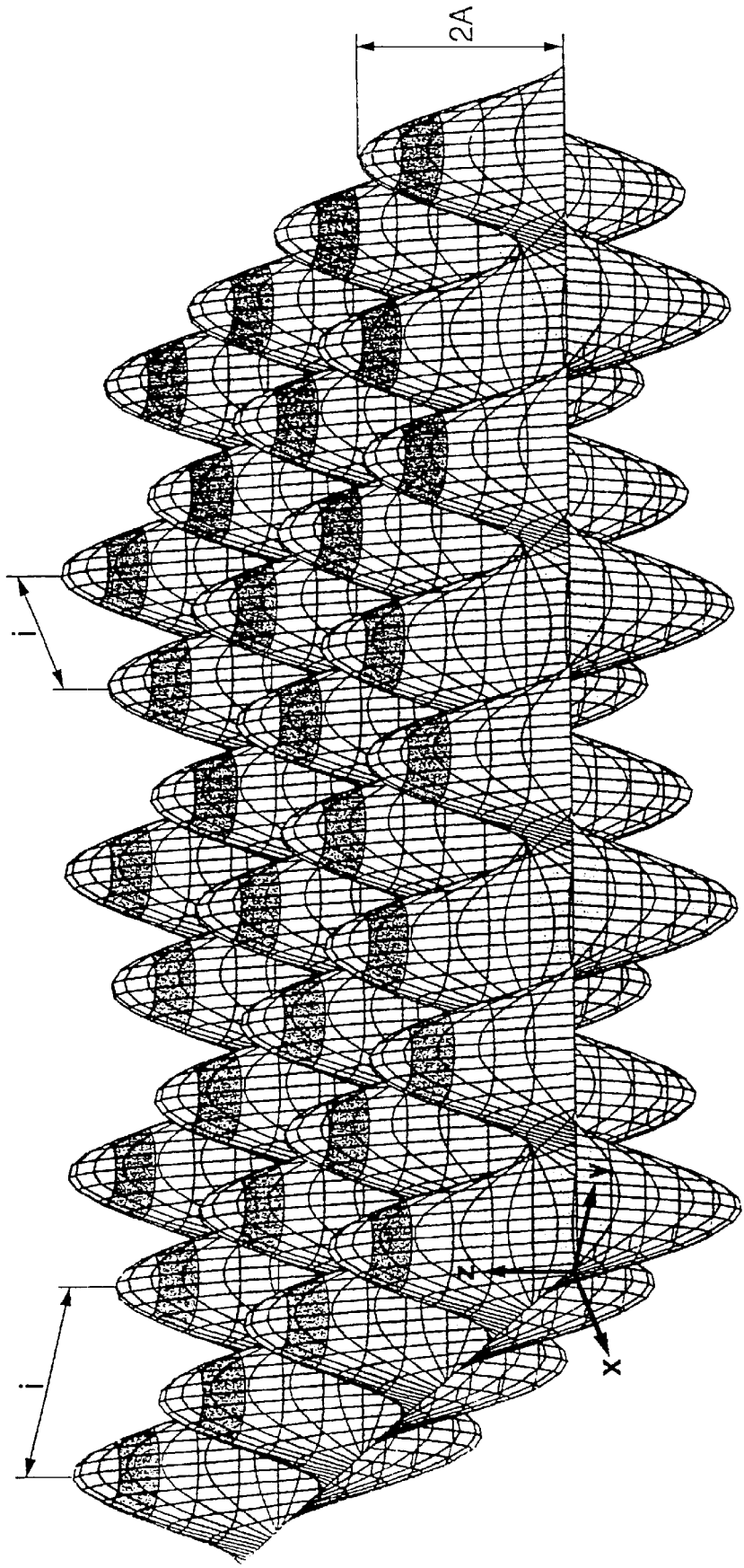

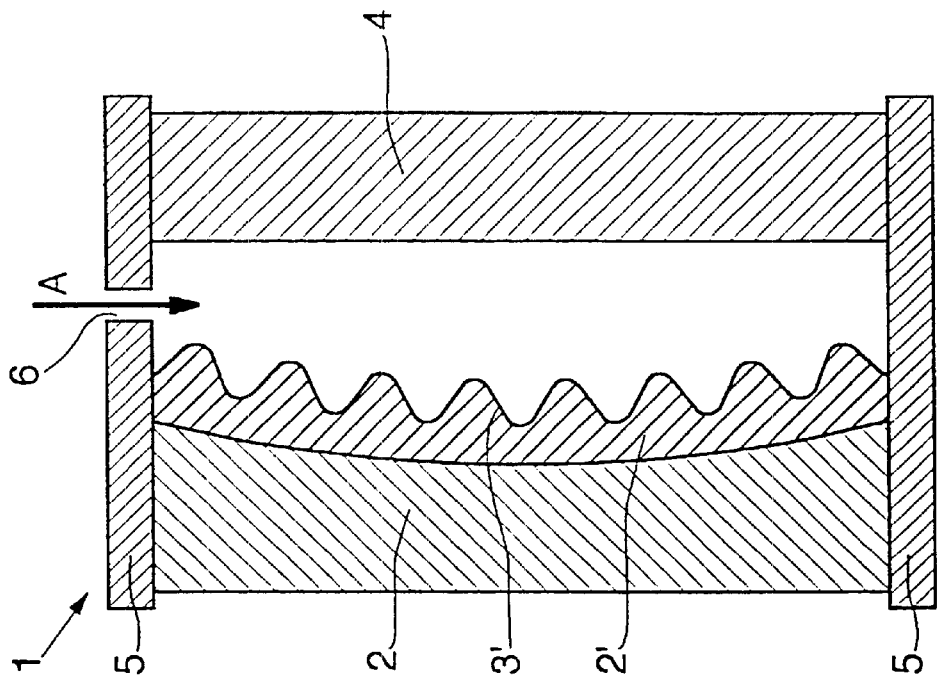
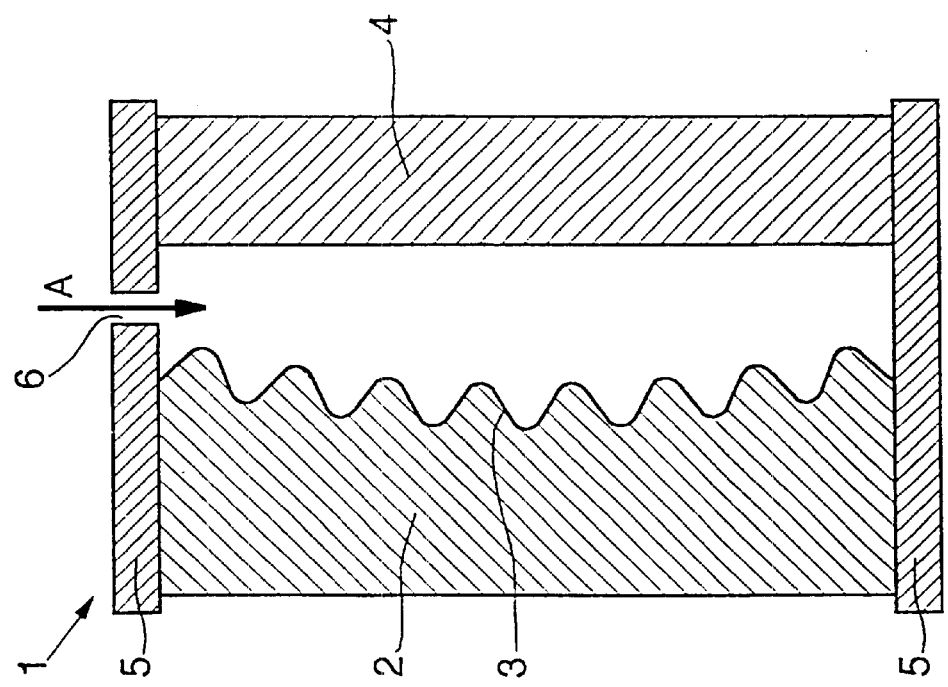

—— LENS FROM EXAMPLE 6

- - - - LENS WITHOUT ANTIGLARE STRUCTURE

METHOD FOR OBTAINING AN OPHTHALMIC LENS COMPRISING A SURFACE UTILITY MICROSTRUCTURE AND RESULTING OPHTHALMIC LENSES

This application is a continuation of international application number PCT/FR98/02572 filed Nov. 30, 1998, which is a continuation of French Application No. 97/15712 filed Dec. 11, 1997.

The present invention relates generally to a process for obtaining an ophthalmic lens comprising a surface utility microstructure and more particularly an antiglare microstructure.

Nowadays the most currently used means to impart antiglare properties to ophthalmic lenses, in particular in organic glass, is to coat on the lens a layer or a system of antiglare layers formed with mineral materials. The use of such antiglare layer in mineral materials has drawbacks in that it may modify the mechanical properties of the lens being obtained, and may modify more particularly the anti-abrasive properties of the hard anti-abrasive layers also coated on the ophthalmic lens.

Reaching optical properties from surface microstructures is a known art in optics. Thus, U.S. Pat. No. 5,630,902 discloses the transfer of a microstructure made with diffractive optical elements into a photopolymerizable material layer coated on a plastics substrate through die stamping, for example with the help of a quartz die supporting the desired microstructure.

U.S. Pat. No. 4,013,465 describes a process for producing a surface having a reduced reflection for electromagnetic radiation, having steps consisting in coating on a substrate surface a layer of a photosensitive material, exposing said material to a regular electromagnetic radiation pattern to which it is sensible and developing the sensible material so that the topography of the developed material surface corresponds to the light patterns so as to obtain a surface having a reduced reflection of the visible radiation.

GB-A-2,027,441 describes a process for producing an article comprising a monolithic plastics shaped layer or body consisting in some cross-linked polymers and comprising one or more surfaces bearing a microstructure replica, comprising the steps of filling a master mould bearing the microstructure with an oligomeric, cross-linkable, flowable fluidic composition being addition polymerizable with a radiation and having "hard" and "soft" segments, and of exposing the cast composition to an actinic radiation so as to form the item. Said document discloses that the term microstructure encompasses discontinuities, such as projections and indentations, in the surface, the profile of which varies from a median or central line passing through the microstructure so that the sum of the surfaces being circumscribed by the surface profile above the line equals the sum of the surfaces below the line, said line being essentially parallel to the normal surface (bearing the microstructure) of the item. The height of such deviations varies from ±0.05 $\mu$m to ±750 $\mu$m over a characteristic length representative of the surface, for example 1 to 30 cm. The medium profile or central line may be plane, concave, convex, aspherical or a combination of such shapes.

The items wherein such deviations are of a lower order, i.e. from ±0.005 $\mu$m to 0.1 $\mu$m or preferably ±0.05 $\mu$m and such deviations are infrequent or appear minimally, i.e. the surface is free from any significant discontinuity, are those for which the microstructure-bearing surface is a "flat" or "perfectly smooth" surface. Such items are useful for example as precision optical elements or elements with a precision optical interface, including ophthalmic lenses. The items for which such deviations are of a lower order but appear frequently are those for example bearing utility discontinuities, like in the case of items having an antiglare microstructure. Items for which deviations are of a high order, i.e. from ±0.1 $\mu$m to ±750 $\mu$m, to which a microstructure can be affected, comprising a set of utility discontinuities, that are identical or different, spaced apart or contiguous, randomly or orderly, are items such as back-reflective sheets, linear Fresnel lenses and video discs. Moreover, said document mentions that it can be necessary or desired to choose particular oligomeric compositions the hardening shrinkage of which is weak so as to avoid parasitic discontinuity occurrence interfering with the utility discontinuities.

The present invention has thus as an object a process for obtaining an ophthalmic lens, i.e. an item having a sight-correcting geometry, comprising a surface utility microstructure, i.e. having optical properties, in particular antiglare properties, the utility microstructure geometry being initially determined by an interferential process.

The present invention has also as an object said thus obtained lenses comprising a sight-correcting geometry surface provided with a utility microstructure, in particular having antiglare properties, the geometry of which is initially determined through an interferential process.

An object of the present invention is thus to provide a process for obtaining an ophthalmic lens, i.e. an item having a sight-correcting geometry comprising a surface utility microstructure, i.e. optical properties, in particular antiglare properties, the utility microstructure geometry being initially determined by an interferential process.

Another object of the present invention is also the so-obtained lenses comprising a sight-correcting geometry surface provided with a utility microstructure, in particular antiglare properties, the geometry of which is initially determined by an interferential process.

Such a utility microstructure may be realised in a surface of the lens itself or in a surface functional layer of the ophthalmic lens.

According to the invention, the process for obtaining an ophthalmic lens comprising a surface utility microstructure the geometry has been initially determined through an interferential process, comprises a step for transferring the microstructure from a mould an internal surface of which supports the microstructure and has a sight-correcting geometry.

Preferably, the sight-correcting geometry surface is a progressive geometry surface. Generally, the bend of the mould progressive geometry surface has a bending radius being measured at any point of the correcting surface comprised between 40 mm and 100 mm.

According to the present invention all conventional moulding types may be used to manufacture ophthalmic lenses such as direct moulding, for example through an integral mould or a composite mould, with added elements or with insert, or overmoulding, and the so-called "transfer" mouldings, for example by die-stamping, or with the well-known method in ophthalmic optics with "In-Mold Coating" transfer.

In a first embodiment of the invention, the mould being used is an integral mould, i.e. the utility microstructure is formed directly in an internal mould surface having the required sight-correcting geometry. The mould may be made with plastics, mineral glass or metal, particularly nickel.

In a second embodiment of the invention, the mould is a composite mould comprising an insert having a surface in which the utility microstructure is formed, said insert suiting to the mould surface having the sight-correcting geometry, so that the insert surface comprising the utility microstructure should also have the required sight-correcting geometry. The insert may be initially shaped so as to have the required sight-correcting geometry and be secured to the corresponding mould surface, for example with an adhesive. The insert may also have initially a plane shape and be then distorted to suit to the mould sight-correcting geometry surface. In this last case, the insert may also be secured to the mould sight-correcting geometry surface with an adhesive. When the microstructure-bearing insert is a plastic element adapted to be applied on a surface of a mould, said element must have a minimum elasticity is in the plane to be able to be correctly applied. Such convenient elements are polyurethane elements having for example a Young modulus measured at 30° C. of 1.2 Gigapascals. Generally, said convenient elements have a lower Young modulus than 2.5 Gigapascals.

Finally, the insert may be made with a layer of such a material as a plastics directly formed on a surface of a substrate.

In a third embodiment of the invention, the mould is a composite mould comprising a plane insert provided with the utility microstructure on one of surfaces thereof, said plane insert being distorted in the mould to suit to the mould sight-correcting geometry surface by applying a pressure or a vacuum in the mould.

According to the process for obtaining ophthalmic lenses according to the invention, there may use all optical materials or compositions, being settable with heat or an actinic radiation, in particular a UV radiation, which can be cast or injected into the mould, and which lead to ophthalmic lenses with the required optical transparency and necessary mechanical properties. Such optical materials or compositions comprise not only the materials and compositions used to manufacture the ophthalmic lens itself, but also the materials and compositions allowing for the deposit of particular functional layers onto an ophthalmic lens, such as the materials adapted to form an anti-abrasive layer on an ophthalmic lens.

Preferably, the optical material or composition is a thermoplastic material or a liquid composition of monomers being settable with heat or an actinic radiation. The liquid monomer compositions are particularly recommended in the process according to the invention.

The monomers useful in the optical monomer compositions for use in the process according to the invention include alkyl (meth)acrylates, in particular $C_1$–$C_4$ alkyl (meth)acrylates such as methyl (meth)acrylate and ethyl (meth)acrylate, allyl derivates such as allyl carbonates of linear or branched, aliphatic or aromatic polyols, and thio (meth)acrylic derivates.

Particularly recommended monomers in the process according to the invention are the allyl carbonates of polyols including ethylene glycol bis allyl carbonate, diethylene glycol bis 2-methyl carbonate, diethylene glycol bis(allyl carbonate), ethylene glycol bis(2-chloro allyl carbonate), triethylene glycol bis(allyl carbonate), 1,3-propane diol bis (allyl carbonate), propylene glycol bis(2-ethyl allyl carbonate), 1,3-butane diol bis(allyl carbonate), 1,4-butane diol bis(2-bromo allyl carbonate), dipropylene glycol bis (allyl carbonate), trimethylene glycol bis(2-ethyl allyl carbonate), pentamethylene glycol bis(allyl carbonate), isopropylene bisphenol-A bis(allyl carbonate). A particularly recommended monomer is the diethylene glycol bis(allyl carbonate).

Another class of monomers convenient for compositions useful in the process of the invention comprises aromatic polyethoxylated (meth)acrylates such as the polyethoxylated bisphenol-A dimethacrylates, in particular those described in French patent application FR-A-2 699 541.

Thio(meth)acrylic monomers may also be used, in particular those described in French patent application FR-A-2 734 827.

Compositions based on polythiols and polyisocyanates in monomeric form may also be used, leading to polythiourethanes such as described for example in patent U.S. Pat. No. 4,689,387.

Finally, compositions may be used including one or more di- or polythiol monomers with one or more monomers bearing reactive unsaturated groups with thiol functions, such as vinyl, (meth)acrylic or thio(meth)acrylic groups.

Of course the monomer compositions may comprise mixtures of the above-mentioned monomers.

It is to be noticed that the higher the refraction index of the layer comprising the microstructure, the higher the antiglare effect. Consequently, the index of the microstructured layer is preferably is equal to or higher than 1.55, more preferably equal to 1.6 or more. Naturally, such microstructured layer may be formed with the organic glass or with a surface layer such as an anti-abrasion coating applied onto a surface of a substrate in organic glass.

Thermoplastic materials useful for the process according to the invention include thermoplastic prepolymers and polymers such as thermoplastic polycarbonates.

According to another aspect of the process of the invention, the utility microstructure is not formed in the ophthalmic lens itself, but in a functional coating applied on such lens, for example an anti-abrasion coating. In this case, in the process according to the invention, any monomer compositions may be used if they are convenient to form on an ophthalmic lens a layer having a particular property, such as an anti-abrasion coating for example.

Such abrasion-resistant settable compositions include the compositions based on a silane hydrolyzate, in particular on an epoxysilane hydrolyzate as described in French patent application 93 026 49, and the compositions based on acrylic derivates.

Naturally, the materials and compositions useful in the process according to the present invention may include any additive conventionally used for producing ophthalmic lenses, in particular thermal and/or photochemical polymerisation initiators and catalysts.

As indicated, the utility microstructure geometry is initially determined with an interferential process, i.e. the utility microstructure is either formed directly on the mould surface with an interferential process or obtained by transfer from a matrix a surface of which comprises a utility microstructure obtained with an interferential process.

More precisely, the interferential process consists in making a pattern of interference fringes by superimposing two coherent light waves, for example two laser beams, and irradiating a photosensitive material layer coated onto a substrate through such pattern of interference fringes.

Then, by developing conventionally the photosensitive material layer, a periodic microstructure is obtained.

Two irradiation steps for the photosensitive layer can be provided by rotating the substrate, preferably by 90° after the first irradiation step, and then the photosensitive material layer is developed conventionally.

A periodic microstructure is then obtained in the plane. Thus, an isotropic structure may be obtained the antiglare properties are independent from the sight angle.

Naturally, patterns of interference fringes having different or identical pitches (i) and amplitudes (2A). Also said irradiation steps may be repeated various times so as to obtain after development a final microstructure formed with multiple superimposed microstructures.

Generally, the wavelength of the coherent light beams, for example laser beams, is comprised between 170 and 510 nm and the pitch of the pattern of interference fringes (and consequently of the periodic microstructure being obtained) is comprised between 100 and 300 nm. The amplitude 2A is comprised generally between 100 and 300 nm.

Preferably plane light waves are used and so a sinusoidal microstructure is obtained.

The periodic microstructure may be generally defined in an orthogonal reference system (x, y, z) with the following equation (1):

$$z = f(x, y) = \sum_{n=1}^{k} \left[ A_n \sin\left(2\pi n \frac{x}{i}\right) + B_n \cos\left(2\pi n \frac{x}{i}\right) \right] + \sum_{m=1}^{k} \left[ C_m \sin\left(2\pi m \frac{y}{i}\right) + D_m \cos\left(2\pi m \frac{y}{i}\right) \right] \quad (1)$$

where $A_n$, $B_n$ are Fourier coefficients in the microstructure in the direction x, $C_m$, $D_m$ are Fourier coefficients in the microstructure in the direction y, and i is the pitch (period) of the microstructure.

Preferably, $B_n = D_m = 0$, $A_n = C_m = A$ (sinusoidal structure) and the pattern of interference fringes and, consequently, the microstructure may be represented by the equation (2):

$$z = f(x, y) = A \left[ \sin\left(2\pi \frac{x}{i}\right) + \sin\left(2\pi \frac{y}{i}\right) \right] \quad (2)$$

where i is the period and A the half-amplitude.

In FIG. 1, a system of 90°-crossed sinusoidal interference fringes is shown.

What has been defined above concerns the case where the pattern of interference fringes is supported by a plane surface.

In the case of a bent surface, the microstructure is slightly distorted with respect to the interference pattern, but does not comprise any abrupt discontinuity.

In particular, the microstructure pitch i may substantially vary depending upon the situation on the correcting surface.

Such distortion can be eliminated by creating a pattern of interference fringes being itself modified to take into consideration the bending of the surface which is to bear the microstructure.

So as to avoid that the cavities in the utility microstructure, in particular the antiglare ones, hold impurities and fats, the microstructure cavities may be filled with a material having a lower refraction index than the microstructure. The index difference for both materials is preferably higher than or equal to 0.1.

An hydrophobic material will preferably be selected as an anti-impurity material.

A convenient anti-impurity material satisfies to the formula:

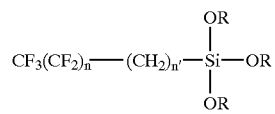

where R is an alkyl radical, for example in $C_1$–$C_6$, and n and n' are integers which can vary independently from 0 to 6.

The remaining description refers to the enclosed drawing wherein, respectively:

FIG. 1 is a theoretical representation for a system of 90°-crossed sinusoidal interference fringes useful to make the microstructure according to the invention;

FIG. 2 is a schematic view of an integral mould useful in a process according to the invention for producing an ophthalmic lens by direct moulding;

FIG. 3 is a schematic view of an insert mould useful in the process for producing an ophthalmic lens according to the invention by direct moulding;

Figure 4:
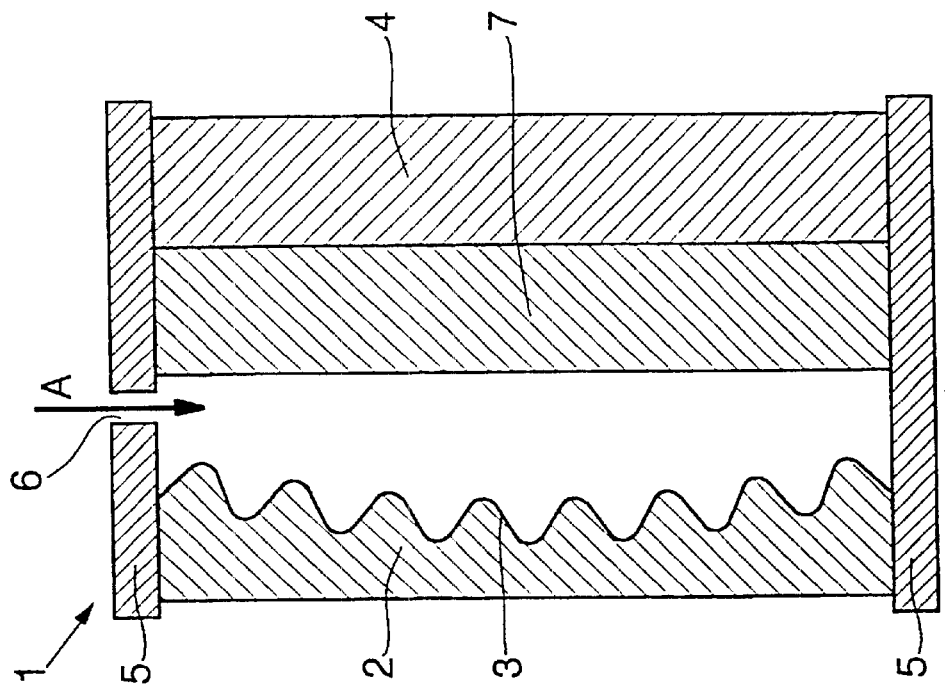
FIG. 4 is a schematic view of a mould comprising a deformable insert useful in the process for producing a lens according to the invention, by direct moulding.

A process for producing an ophthalmic lens according to the invention will be now described referring to FIGS. 1 to 4 corresponding to a production process by direct moulding.

In such figures the same elements are identified by the same reference numbers.

The ophthalmic lenses in organic glass may be made by moulding between two parts 2, 4 of a mould 1 connected with securing elements 5. An optical material or composition is then introduced into the mould assembly through a hole 6 either by casting or injection and is hardened or polymerised therein so as to obtain an ophthalmic lens after dismantling the mould. Generally at least one of the mould parts 2, 4 comprises an internal surface, for example the surface 3, having a sight-correcting geometry.

According to the invention, as shown in FIGS. 2 and 3, the internal face 3 or 3 of a mould part 2 is provided with an utility microstructure, i.e. optical properties, preferably antiglare effects.

In the embodiment shown in FIG. 2, the mould part 2, the surface 3 of which comprises the utility microstructure, is formed directly in the mould part. The mould part comprises the microstructured correcting geometry surface in metal, for example in nickel, or in plastics. The geometry of such microstructure is initially determined by an interferential process, for example by using the pattern of interference fringes shown in FIG. 1.

A first method to produce an integral mould part provided with a microstructured correcting geometry surface consists in making a metallic matrix, for example in nickel, by galvanoplasty as above described. If the matrix is thick enough, it may be used directly as a mould part.

A second method to produce an integral mould part provided with a microstructured correcting geometry surface consists in coating on a sight-correcting geometry surface of a mineral glass substrate a photosensitive resin layer and, through the above-mentioned interferential process, forming the desired microstructure therein. By plasma-isotrope bombardment (for example an argon-$CHF_3$ plasma) of the hardened layer, the microstructure is transferred to the glass substrate. Such a transfer process is described in the patent FR-A-2 663 431.

A third method to produce an integral mould part consists in carrying out the moulding of a mould part from a mould one of the parts of which comprises a utility microstructure initially carried out with an interferential process.

It is also possible to form directly the utility microstructure on a surface of a correcting geometry composite mould part. In such a case, a photosensitive resin layer is coated on the correcting geometry surface of the mould part and through the above-mentioned process consisting in forming light interferences on the resin and then developing them, the required microstructure pattern is obtained.

A method for producing a composite mould part a part of which has a microstructured correcting geometry surface is by duplication by polymerisation. A layer of a polymerizable resin is coated onto a correcting geometry surface of a substrate. Then, the coated substrate is put in close contact with a microstructured surface of a matrix, for example in metal (nickel), for example by vacuum or pressure application. After either a thermal or a photochemical (UV radiation) polymerisation through the coated substrate (according to the nature of the resin layer) and dismantling, a mould part is obtained being made of a substrate a correcting geometry surface of which is provided with the required utility microstructure.

FIG. 3 shows the case where the utility microstructure is supported by an insert 2' a surface 3' of which is provided with the utility microstructure. Such an insert which may be a metal, for example nickel, or a plastic may be obtained as above mentioned. Since it has to be secured with a surface of the mould part 2 having a sight-correcting geometry, it may be either shaped beforehand with the required geometry or distorted, for example by die-stamping, upon the arrangement thereof on the mould part 2 so as to suit to the geometry of such part. Generally such an insert 2' is secured with the surface 3 of the mould part 2 with an adhesive.

The production of a microstructured ophthalmic lens according to the invention is carried out generally by casting into the mould through the inlet hole 6 of a liquid composition of optical monomers or by injection of an optical thermoplastic material. After withdrawal from the mould, an ophthalmic lens is obtained having a surface bearing a utility microstructure, in particular with antiglare properties.

In FIG. 4, there is shown another embodiment of a mould useful in the process according to the invention, which is characterised in that it comprises a plane deformable insert 2' provided on one of the surfaces thereof with a utility microstructure 3', preferably having antiglare effects. Such plane insert 2' may be deformed upon moulding the ophthalmic lens by creating a vacuum in the mould 1 on the insert surface opposed from the microstructure-bearing surface 3' so as to suit to the geometry of the surface 3 of the mould part 2, generally a sight-correcting geometry. Alternately, such insert 2' may be distorted by the pressure applied by the liquid composition of monomers cast into the mould through the inlet hole 6 or by the optical thermoplastic material injected into the mould through said hole 6, so as again suit to the sight-correcting geometry face of the mould part 2.

The deformable insert 2' may be a plastic or metallic insert, preferably metallic, for example nickel.

An advantage of the use of such a mould in the process of the invention is that various inserts having similar or different microstructures may be shaped on a same plane band, and then cut and used in the mould depending upon the required microstructure. Moreover such inserts may be thrown away and easily substituted.

Figure 5:
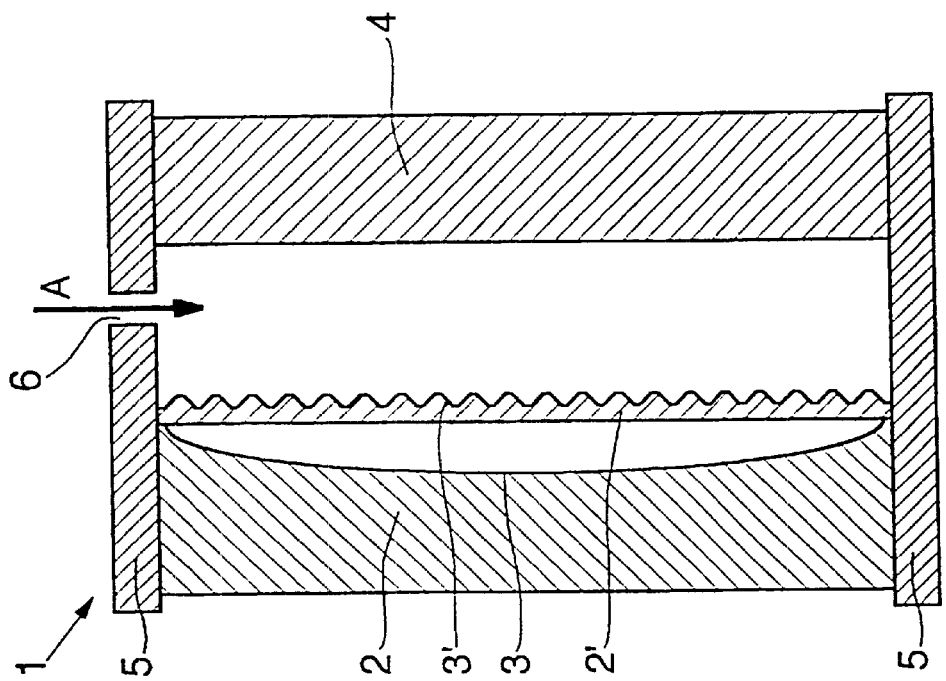
FIG. 5 is a schematic view of a mould useful in the process for producing an ophthalmic lens according to the invention, by overmoulding.
Figure 6:
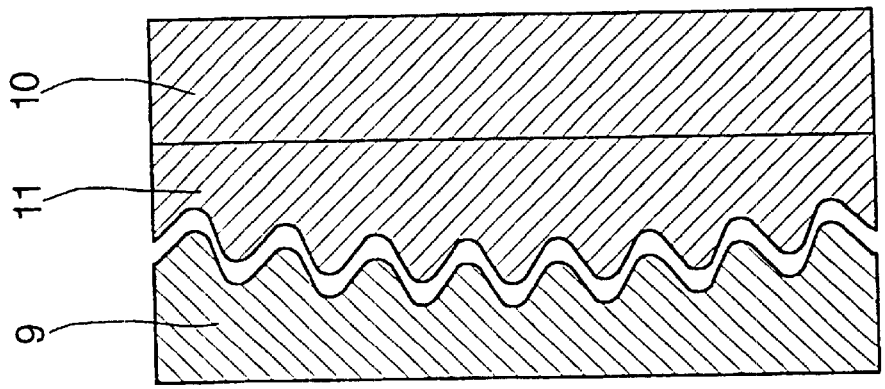
FIG. 6 is a schematic view of a process for producing an ophthalmic lens according to the invention by die stamping.
Figure 7:
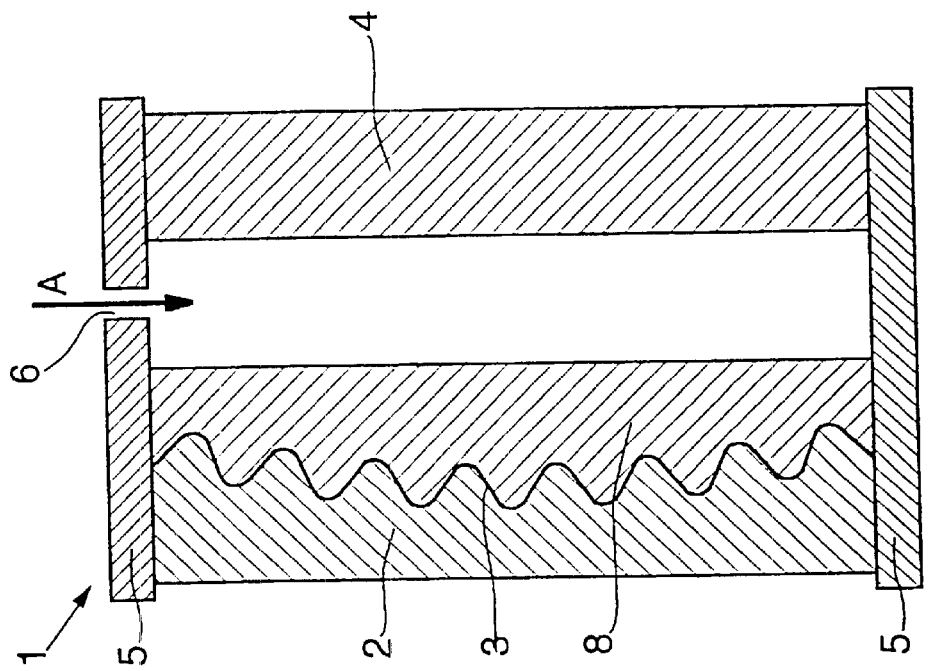
FIG. 7 is a schematic view of a mould useful for producing an ophthalmic according to the invention through a so-called "In-Mould Coating" process.

FIGS. 5 to 7 show a process for producing ophthalmic lenses according to the invention by transfer moulding.

Referring more particularly to FIG. 5, there is shown schematically a mould for "overmoulding" transfer of an ophthalmic lens. According to such a process, a mould similar to the mould of FIG. 2 is used, but an ophthalmic lens preform 7 is arranged inside this mould and a liquid composition of monomers is cast or an optical thermoplastic is injected through the hole 6 in the mould.

The utility microstructure supported by the internal surface 3 of the mould part 2 is then transferred into the upper layer shaped above the preform 7. Such a technique has this advantage that the utility microstructure can be transferred not into the ophthalmic lens mass, but into a functional layer coated on the lens preform 7, including for example an abrasion-resistant layer. Thus, a layer may be formed with simultaneously abrasion-resistance and antiglare properties.

FIG. 6 shows another embodiment of the process according to the invention, wherein the utility microstructure is formed in the ophthalmic lens through a die-stamping process. In such a case, generally, by means of a mould part 9 with a required correcting geometry surface provided with an adequate microstructure, a corresponding surface is arranged in an ophthalmic lens preform comprising a substrate 10 and a surface layer 11 by imprinting the microstructure-bearing surface of the mould part into the surface layer 11.

The use of such die-stamping technique has the advantage to allow to produce the utility microstructure in a coating layer for an ophthalmic lens, such as a hard abrasion-resistant layer.

FIG. 7 relates to the in-mould coating technique well known in the technique of manufacture for ophthalmic lenses.

In such a technique, a layer 8 of an optical material, for example a hard anti-abrasion material layer, is formed on the mould part 2 comprising a sight-correcting geometry face 3 provided with a utility microstructure. Thus, the microstructure of the mould part 2 is directly transferred to the layer 8. Then an optical composition or material is introduced through the mould hole 6 by casting or injection and are hardened or polymerised either thermally or under an actinic radiation, for example an UV radiation. After withdrawal from the mould, an ophthalmic lens is obtained comprising on an optically transparent substrate a microstructured optically transparent layer with the required correcting geometry.

Naturally, the mould parts may have any convenient shapes, in particular convex, concave or other, depending upon the required correcting geometry.

Obviously, the materials used for the mould parts will be selected depending upon the process for polymerising or hardening the optical compositions and materials used to produce the lens or the functional layer on the lens. Thus, mould parts made of transparent plastics will be used in the case of a polymerisation or a hardening through an actinic radiation.

The following examples illustrate the present invention.

EXAMPLE 1

Production of an Anti-reflection, Abrasion-resistant Lens in Diallyl Diglycol Dicarbonate Through an In-mould Coating Process A nickel insert with a surface provided with a periodic type microstructure resulting initially from an interferential process is glued on the internal face of a glass mould part.

The resulting mould is cleaned with acetone, then treated with a fluorohydrocarbon (HCFC) solution containing 0.26% solids E-349, a release agent sold by Société Chem-Trend Inc.

The microstructured face of the mould part is dip-coated with a layer of a coating composition obtained by hydrolysis of an alkoxysilane, including glycidoxy propyl trimethoxysilane, methyl trimethoxysilane, itaconic acid and colloidal silica.

The coating composition is pre-hardened up to be "dust-free", i.e. it is no longer tacky.

The mould part coated with the microstructure on its internal face is used to mould the front face of the lens and the mould part in conventional mineral glass (without microstructure) is used to mould the back face of the lens.

Both mould parts are assembled and held at distance by a joint and a securing clip maintains the whole assembly.

The mould is then filled with diallyl diglycol dicarbonate (from PPG Company) containing as a catalyst diisopropyl peroxy dicarbonate (also available by PPG Company).

The monomeric composition is then hardened thermally.

At the end of the heat hardening cycle, the mould is dismantled with a convenient tool and a lens is obtained having abrasion-resistance and antiglare properties, both superior to an uncoated lens obtained from a mould in conventional mineral glass (without microstructure).

EXAMPLE 2

Production of an Anti-reflection, Abrasion-resistant Lens in Polythiourethane with an Refraction Index of 1.6 Through an In-mould Coating Process.

A nickel insert with a surface provided with a periodic type microstructure resulting initially from an interferential process is glued on a surface of a mineral glass mould part. The mould is cleaned as in example 1.

A coating composition, as described in example 3 of patent FR-A-93 02 649 (hydrolyzate of glycidoxy propyl trimethoxy silane, dimethyl diethoxy silane and colloidal silica) is dip-coated on the microstructured surface by using a lab dip-coating machine.

The coating is hardened up to be "dust-free" at a temperature of 80° C. during 15 minutes. The so-coated mould part is used to mould the front face of the lens and the mould part in conventional mineral glass (without microstructure) is used to mould the back face of the lens.

Both mould parts are assembled and held at distance by a joint and a securing clip maintains the whole assembly.

The mould is then filled with monomer MR6® (sold by Mitsui-Toatsu Company) containing dibutyltin as a catalyst. The monomeric composition is then hardened to obtain a polyurethane lens with a refraction index of 1.6 by using the following air heat hardening cycle:

| Time (minutes) | Temperature (° C.) |
| --- | --- |
| 0 | 20 |
| 1 | 32 |
| 25 | 32 |
| 33 | 60 |
| 35 | 80 |

-continued

| Time (minutes) | Temperature (° C.) |
| --- | --- |
| Withdrawal of the joint | |
| 37 | 120 |
| 39 | 120 |
| 41 | 75 |

At the end of the hardening cycle, the mould is dismantled with a convenient tool to obtain, after a post-hardening at 110° C. during 3 hours, a lens with a scratching resistance in the steel wool test and antiglare properties higher than those of an uncoated lens prepared with an similar process.

EXAMPLE 3

The example 2 is repeated, but using a coating composition based on an epoxysilane hydrolyzate containing colloidal titane.

A lens is obtained with similar properties as for example 2.

EXAMPLE 4

Production of a Plastic Mould in Diallyl Diglycol Dicarbonate Provided with a Periodic Type Microstructure A mould similar to this of example 1 is cleaned with acetone. With the same procedure as in example 1, the mould is filled with a diallyl diglycol dicarbonate composition containing triallyl cyanurate and catalysed with isopropyl peroxy dicarbonate sold by PPG Industries. The composition is hardened through the following heat hardening cycle:

| Time (minutes) | Temperature (° C.) |
| --- | --- |
| 15 | 46 |
| 45 | 46 |
| 30 | 49 |
| 60 | 49 |
| 60 | 54 |
| 45 | 54 |
| 45 | 58 |
| 120 | 58 |
| 45 | 62,5 |
| 45 | 62,5 |
| 60 | 67,5 |
| 45 | 67,5 |
| 60 | 72 |
| 45 | 72 |
| 60 | 78 |
| 60 | 78 |

At the end of the hardening cycle, the mould is dismantled with a convenient tool to obtain a substrate having a microstructure face. Such a substrate is used as a plastic mould part in the following example.

EXAMPLE 5

Production of a Lens Having a Medium Refraction Index and Antiglare Properties on Both Faces The mould part provided With the microstructure of the mould according to the example 1 is cleaned with acetone and used to mould the front face of a lens. The plastic microstructured substrate of example 3 is used to mould the back part of the lens.

Both mould parts are assembled and held at distance by a joint and a securing clip maintains the whole assembly.

The mould is then filled with a UV hardening material for lenses with a medium index containing poly(ethoxylated) bisphenol-A dimethacrylate.

The material is then hardened via a UV hardening cycle by means of a "Fusions System V Bulb" lamp for the pre-hardening and for the post-hardening an oven MRE UV using a medium pressure mercury lamp during 2 minutes.

At the end of the hardening cycle and after dismantling the mould, a lens is obtained with antiglare properties on both faces.

EXAMPLE 6

Production of a UV Hardened Substrate Having a Medium Index and Antiglare Properties on One Face A nickel insert provided with a microstructure formed with two 90°-crossed sinusoidal type periodic structures having an identical period of 250 nm and resulting initially from an interferential process is glued to a mould part in mineral glass. Such mould part is used to mould the front face of a lens, whereas a mould part in conventional mineral glass (without microstructure) is used to mould the back face of the lens. Both mould parts are assembled and held at distance by a joint and a securing clip maintains the whole assembly. The mould is then filled with a material for lenses with a medium index made of polyethoxylated bisphenol-A dimethacrylate hardenable by UV. Such a copolymerizable composition is described in the publication FR-A-2 699 541. The material is then hardened by UV irradiation by using for the pre-hardening a "Fusions System V Bulb" lamp and for the post-hardening an oven MRE UV using a medium pressure mercury lamp during 15 minutes.

At the end of the hardening cycle, the mould is dismantled with a convenient tool and a lens is obtained having one surface with antiglare properties.

Figure 8:
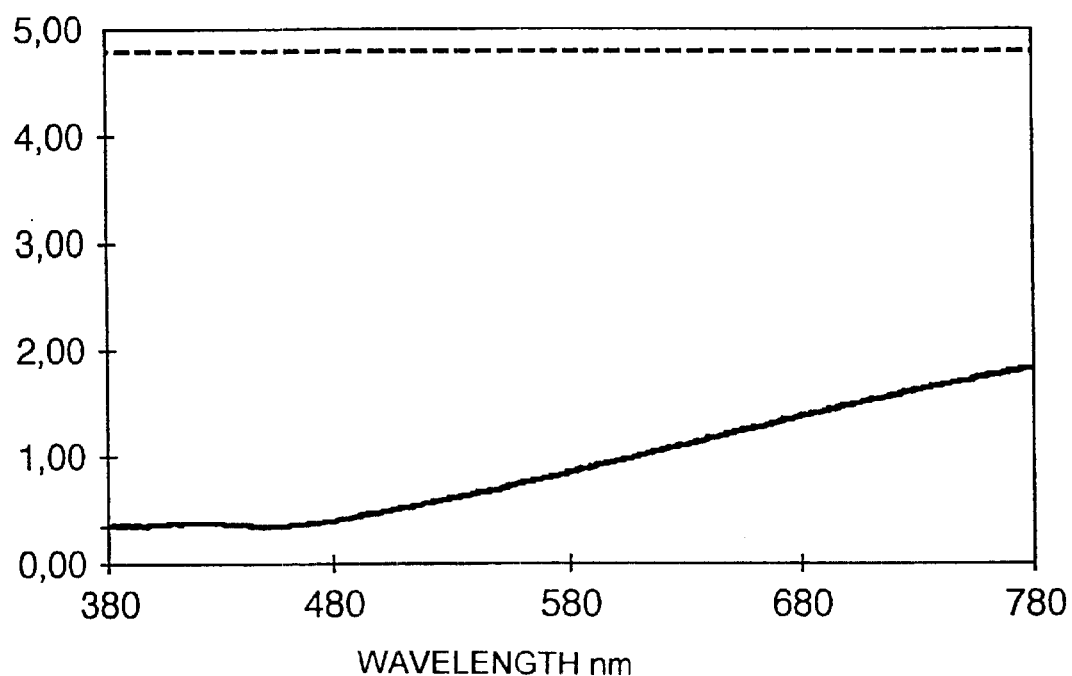
FIG. 8 is a diagram of the reflection percentage of a microstructured lens according to the invention and of a conventional lens (without any microstructure) versus the light wavelength.

In the FIG. 8 there is shown the reflection percentage versus the wavelength for the lens of example 6, as well as for a similar lens, but with no microstructure.

FIG. 8 clearly shows the improvement of the antiglare properties obtained with the microstructured lenses according to the invention.

The reflection colour according to the CIE standard has the following properties:

Colour: golden

Tint angle (degree): 60

Chroma C*: 6,5

R medium: 0.77

R visible: 0.75.

EXAMPLE 7

Production of a Substrate with Medium Index Being UV Hardened and Antiglare Properties on Both Faces A nickel insert having a surface provided with a periodic microstructure resulting initially from an interferential process is glued to a mould part in mineral glass. Such mould part is used to mould the front face of a substrate, whereas a mould part in conventional mineral glass (without microstructure) is used to mould the back face of the substrate.

Both mould parts are assembled and held at distance by a joint and a securing clip maintains the whole assembly.

The mould is then filled with a material for lenses with a medium index made of a UV bisphenol-A poly(éthoxy) dimethacrylate identical to example 6. The material is then hardened by a UV hardening cycle by using for the pre-hardening a "Fusions System V Bulb" lamp. After a dismantling of the mould, the non microstructured face of the mould is overmoulded with the mould comprising the microstructure and again hardened. The assembly is then UV post-hardened in an oven MRE UV using a medium pressure mercury lamp during 15 minutes.

At the end of the hardening cycle, the mould is dismantled with a convenient tool and a lens is obtained having antiglare properties on both faces. The transmission Tv of the resulting lens is higher than 98%, whereas the transmission of a conventional lens is always lower than 90%.

EXAMPLE 8

Production of a Substrate with a Medium Index and Being UV Hardened with Antiglare Properties on One Face A nickel insert provided with a periodic microstructure resulting initially from an interferential process is used as an insert upon a joint moulding process. The nickel insert is pressed onto a glass mould through a joint fixing simultaneously the distance between both mould parts being maintained together by a clip. The mould is then filled with the material for lenses with a medium index being UV hardened according to the example 6. The material is then hardened by a UV hardening cycle by using a pre-hardening with a "Fusions System V Bulb" lamp, and then a post-hardening with an oven MRE UV by using a medium pressure mercury lamp during 15 minutes.

At the end of the moulding cycle, the mould is dismantled with a convenient tool to obtain a lens having antiglare properties similar of those of the lens of example 7.

EXAMPLE 9

Production of a Lens with a Medium Index and Being UV Hardened with Antiglare Properties on Both Faces A periodic microstructure initially determined by an interferential process is incorporated into a face of a plastic film in poly(ethylene terephthalate). The film is then glued on the convex face of a bent mould in mineral glass (−4 dioptries) and another similar film is glued on the concave face of a bent mould part in mineral glass (−4 dioptries).

Both mould parts are assembled and held at distance by a joint and a securing clip maintains the whole assembly. The mould is then filled with a material for lenses with a medium index being UV hardened identical to example 6. The material is then hardened by a UV hardening cycle by using a "Fusions System V Bulb" lamp for the pre-hardening and then an oven MRE UV using a medium pressure mercury lamp during 15 minutes for the post-hardening.

At the end of the hardening cycle, the mould is dismantled with a convenient tool to obtain a lens is obtained having antiglare properties on both faces. The reflection properties on each face are the same as those described for the example 6.

The transmission Tv is higher than 98%, whereas the transmission of a conventional lens (non microstructured) is always lower than 90%.

What is claimed is:

1. A process for producing an ophthalmic lens comprising a surface antiglare utility microstructure and a sight-correcting geometry, the process comprising transferring an interferentially-determined microstructure to a surface of a lens from a mold comprising an internal surface with a slight-correcting geometry that supports the microstructure, wherein transferring the interferentially determined microstructure to the surface of the lens comprises:

forming a layer of a first optical material in the mold, the layer formed on an internal face of the mold which face supports a replica of the microstructure;

hardening the layer of the first optical material;

introducing to the mold a second optical material;

hardening the second optical material; and obtaining an ophthalmic lens comprising a substrate of the hardened second optical material and a surface of the hardened first optical material, the surface having the microstructure.

2. The process of claim 1, further comprising obtaining the interferentially-determined microstructure through an interferential process.

3. The process of claim 1, wherein the microstructure is further defined as a periodical microstructure.

4. The process of claim 3, wherein the periodical microstructure has a period of 100 nm to 300 nm.

5. The process of claim 1, wherein the sight-correcting geometry surface of the mold is further defined as having a progressive geometry.

6. The process of claim 1, wherein the sight-correcting geometry surface has a bending radius of 40 mm to 100 mm.

7. The process of claim 1, wherein the mold is an integral mold and the microstructure is formed directly on the internal mold surface that supports the microstructure.

8. The process of claim 7, wherein the mold is comprised of plastic, metal, or mineral glass.

9. The process of claim 1, wherein the mold is a composite mold having at least two layers and one of the at least two layers supports the microstructure.

10. The process of claim 9, wherein the layer supporting the microstructure is formed by applying a material layer onto the sight-correcting geometry surface of the mold, the material being adapted to allow the development of a microstructure on its surface opposed to the correcting geometry surface of the mold.

11. The process of claim 1, wherein the microstructure is formed on a face of an insert and the insert is then suited to the mold surface having the sight-correcting geometry.

12. The process of claim 11, wherein the insert has a shape corresponding to the sight-correcting geometry surface of the mold and is secured to the sight-correcting geometry surface of the mold.

13. The process of claim 12, wherein the insert is secured to the sight-correcting geometry surface of the mold with an adhesive.

14. The process of claim 11, wherein the insert initially has a planar configuration that is subsequently distorted to suit to the sight-correcting geometry surface of the mold.

15. The process of claim 11, wherein the insert is further defined as a deformable plane insert and the insert is distorted in the mold to suit to the sight-correcting geometry surface of the mold.

16. The process of claim 15, wherein the insert is distorted in the mold by a process comprising creating a vacuum on a face of the insert opposed to the face of the insert on which the microstructure is formed.

17. The process of claim 15, wherein the insert is distorted in the mold by a process comprising creating a pressure on the face of the insert on which the microstructure is formed.

18. The process of claim 17, wherein the pressure is a casting pressure of a composition of optical monomers.

19. The process of claim 17, wherein the pressure is an injection pressure of an optical thermoplastic material.

20. The process of claim 1, wherein said first and/or second optical material is a composition of optical monomers that are thermosettable.

21. The process of claim 1, wherein said first and/or second optical material is a composition of optical monomers that can be hardened by an actinic radiation.

22. The process of claim 1, wherein the layer of the first optical material is formed by a process comprising applying a liquid composition of optical monomers onto the mold.

23. The process of claim 1, wherein the layer of the first optical material is formed by a process comprising injection of a thermoplastic material.

24. The process of claim 1, wherein the introduction of the second optical material comprises casting a liquid composition of optical monomers.

25. The process of claim 1, wherein the introduction of the second optical material comprises injecting an optical thermoplastic material.

26. The process of claim 1, wherein the hardened layer of the first optical materials is further defined as an abrasion-resistant coating.

* * * * *

UNITED STATES PATENT AND TRADEMARK OFFICE
CERTIFICATE OF CORRECTION

PATENT NO. : 6,491,851 B1
DATED : December 10, 2002
INVENTOR(S) : Gerhard Keller et al.

It is certified that error appears in the above-identified patent and that said Letters Patent is hereby corrected as shown below:

<u>Column 13,</u>
Line 7, please delete "slight" and insert -- sight -- therefor.

<u>Column 14,</u>
Line 46, please delete "materials" and insert -- material -- therefor.

Signed and Sealed this

Eighteenth Day of March, 2003

JAMES E. ROGAN
*Director of the United States Patent and Trademark Office*